United States Patent

[11] 3,627,853

| [72] | Inventors | Alexander Edward Bond;<br>Bruce Robert Owen Pointer, both of<br>Welywyn Garden City, England |
|---|---|---|
| [21] | Appl. No. | 846,913 |
| [22] | Filed | Aug. 1, 1969 |
| [45] | Patented | Dec. 14, 1971 |
| [73] | Assignee | Imperial Chemical Industries Limited<br>London, England |
| [32] | Priority | Aug. 22, 1968 |
| [33] | | Great Britain |
| [31] | | 40,235/68 |

[54] CHLORINATION OF VINYL CHLORIDE BLOCK COPOLYMERS
15 Claims, No Drawings

[52] U.S. Cl. .................................................. 260/878 B,
260/23 AR, 260/23 XA, 260/45.75 R, 260/92.8,
260/881, 260/884
[51] Int. Cl. .................................................. C08f 15/00,
C08f 27/02
[50] Field of Search .......................................... 260/878,
884, 885, 878 B, 884

[56] References Cited
UNITED STATES PATENTS

| 3,290,265 | 6/1966 | Kaneko | 260/29.6 |
| 3,373,228 | 3/1968 | Glazer et al. | 260/884 |
| 3,487,129 | 12/1969 | Platzer | 260/878 |

FOREIGN PATENTS

| 721,324 | | Belgium | |
| 893,288 | 4/1962 | Great Britain | |
| 948,372 | 2/1962 | Great Britain | |
| 976,001 | 11/1964 | Great Britain | |
| 1,081,057 | 8/1967 | Great Britain | |
| 1,093,374 | 11/1967 | Great Britain | |
| 1,041,992 | 9/1966 | Great Britain | 260/884 |
| 1,101,540 | 1/1968 | Great Britain | |

Primary Examiner—Joseph L. Schofer
Assistant Examiner—Stanford M. Levin
Attorney—Cushman, Darby & Cushman

ABSTRACT: Chlorination of heterogeneous copolymers made by polymerizing vinyl chloride and adding a small amount of comonomer after conversion has reached >40 percent and continuing polymerization at an elevated temperature.

CHLORINATION OF VINYL CHLORIDE BLOCK COPOLYMERS

This invention relates to polymeric materials and in particular to afterchlorinated vinyl chloride polymers.

In our Belgian Pat. No. 721,234 we describe a process for making vinyl chloride polymers having improved gelation characteristics wherein vinyl chloride is polymerized at a first polymerization temperature and a copolymerizable monomer, that copolymerizes with vinyl chloride to form a copolymer of lower softening point than polyvinyl chloride, is injected when at least 40 percent by weight of the vinyl chloride has been converted to polymer and the mixture of the remaining vinyl chloride and the comonomer is then polymerized at a temperature at least 5° C. higher than said first polymerization temperature.

We have found, most unexpectedly, that if these or similar copolymers are afterchlorinated than materials are obtained having a higher softening point, than, but similar processability to, afterchlorinated vinyl chloride homopolymers having a similar chlorine content.

Therefore according to the present invention we provide a process for the manufacture of afterchlorinated vinyl chloride polymers comprising afterchlorinating a vinyl chloride copolymer made by polymerizing vinyl chloride at a first polymerization temperature, adding a copolymerizable monomer when at least 40 percent by weight of the vinyl chloride has been converted to polymer, the amount of added comonomer being, by weight, less than the amount of the remaining unreacted vinyl chloride, and polymerizing the mixture of the remaining vinyl chloride and the comonomer at a temperature at least 5° C. higher than said fist polymerization temperature.

Consequently by chlorinating these particular vinyl chloride copolymers (which themselves often have lower softening points than the corresponding vinyl chloride homopolymers) to a lesser degree it is possible to obtain a material of equivalent softening point to an afterchlorinated vinyl chloride homopolymer and having improved processability, or by chlorinating to the same final chlorine content, to obtain a material of equivalent processability to an afterchlorinated vinyl chloride homopolymer but having an increased softening point.

Alternatively, there may be used as the comonomer a compound that copolymerizes with vinyl chloride to give a copolymer of higher softening point than a vinyl chloride homopolymer. Examples of such comonomers are acrylonitrile and the N-aryl maleimides such as N-phenyl maleimide and N-o-chlorophenyl maleimide. By the use of such comonomers a material of even higher softening point may be obtained and yet having a not substantially different processability to an afterchlorinated vinyl chloride homopolymer.

We prefer, however, to use comonomers that give a copolymer of lower softening point than polyvinyl chloride as these give polymers having the better processing characteristics.

Ethylenically unsaturated monomers that may be copolymerized with vinyl chloride to give materials of lower softening point than polyvinyl chloride include vinyl esters such as vinyl acetate and vinyl stearate; vinylidene chloride; alkyl acrylates and methacrylates such as ethyl acrylate, butyl acrylate, 2-ethyl hexyl acrylate and methyl methacrylate, and olefines such as ethylene and propylene.

By the term "lower softening point than polyvinyl chloride" we mean that the copolymer obtained by polymerizing the same amount of unreacted vinyl chloride remaining in the reaction vessel at the time of addition of the comonomer in the process of our invention with the amount of comonomer added has a lower 1/10 Vicat softening point (British Standard 2782, Part 1, Method 102F) than that of a vinyl chloride homopolymer prepared under the same conditions. Thus, for example, if a vinyl chloride homopolymer prepared by polymerization at 50° C. has a 1/10 Vicat softening point of 80° C. than for a comonomer X to be suitable for use in the preferred process of the present invention when added to the polymerization at 50° C. of 100 parts by weight of vinyl chloride in an amount of, say, five parts by weight when the conversion of vinyl chloride to polymer is, say, 70 percent, i.e., leaving 30 parts by weight of unreacted vinyl chloride, a copolymer made by copolymerizing 30 parts by weight of vinyl chloride with five parts by weight of the comonomer X, under the same conditions at 50° C., must have a 1/10 Vicat softening point of less than 80° C.

The amount of comonomer used should be less than the amount of unreacted vinyl chloride remaining in the autoclave of reaction vessel at the time of addition of the comonomer. This if the comonomer is added when the conversion of monomeric vinyl chloride to polymer is 70 percent by weight, i.e., leaving 30 percent by weight of the original vinyl chloride monomer unreacted, up to 30 percent by weight based on the weight of vinyl chloride of the original charge, of the comonomer may be added, while if the comonomer is added when the conversion of monomeric vinyl chloride to polymer is 90 percent by weight, only up to 10 percent by weight, based on the weight of the original vinyl chloride monomer charge, of the comonomer may be added. Generally the amount of comonomer added is relatively small and is preferably from about 0.2 to 10 percent, preferably 0.5 to 5 percent by weight, based on the weight of the original vinyl chloride charge.

As set out above, the comonomer is added when the conversion of the vinyl chloride to polymer has reached at least 40 percent by weight. If it is added before this, then little or no advantage in processing characteristics will be obtained compared with a copolymer made with all the comonomer present throughout the reaction. Likewise in order to ensure that the amount of copolymer formed in the latter stage of the process is sufficient to have a marked effect on the properties of the polymer composition, we prefer that the comonomer is added before 95 percent by weight of the initial monomeric vinyl chloride charge has been converted to polymer. A particularly useful range of conversions at which the comonomer may be added is from 42 to 70 percent.

The degree of conversion of monomer to polymer at any particular reaction time may be established by a series of experiments in which vinyl chloride is polymerized under the same conditions and in separate experiments stopping polymerization at different times by venting off the monomer remaining and determining the amount of polymer formed. The conversion may then be calculated and so a graph of conversion against reaction time can be plotted.

The temperature of the copolymerization process should be at least 5° C. higher than the temperature of the homopolymerization stage of the reaction, and is preferably from 10° to 35° C., particularly 15° to 30° C. higher. Both stages of the process may be carried out at temperatures normally used for vinyl chloride polymerization in the range 30° to 85° C., but the temperatures should carefully be selected to obtain a polymer of the desired K-value, which in this specification is obtained from measurements of the relative viscosity ($\eta$ rel) of a solution of 0.5 g. polymer in 100 ml. of ethylene dichloride at 25° C. using the equation.

$$\log_{10} \eta \text{ rel} = \left[\frac{75k^2}{1+1.5kC}+k\right]C$$

where K-value $K=1,000k$ and $C=$concentration of solution in g./100 ml. Preferably the first stage is conducted at a temperature within the range 35° to 60° C. and the second stage within the range 65° to 80° C. Thus for example the homopolymerization may be performed at 50° C. and the copolymerization at 55° to 85° C., preferably 65° to 80° C.

It is not essential that the temperature should be increased suddenly. Indeed it is often advantageous, in the interest of ease of controlling the reaction, to permit the temperature to increase slowly or in distinct stages. As the polymerization of vinyl chloride is an exothermic reaction, the temperature may conveniently be increased by reducing or stopping the flow of cooling medium, generally water, applied to control the reaction.

The temperature may be increased before, during, or after the addition of the comonomer. We prefer however, to increase the temperature at the same time as adding the comonomer.

The copolymerization reaction need not be taken to completion but should be continued for a sufficient time so that at least 40 percent by weight of the vinyl chloride remaining in the reaction vessel at the time of addition of the comonomer is converted to polymer.

The polymerization reaction may be carried out by any suitable process including bulk, solution, emulsion, or suspension polymerization processes. However, polymerization in aqueous suspension is strongly preferred using monomer-soluble catalysts. Suitable catalysts include diacyl peroxides such as lauroyl and benzoyl peroxide; peroxydicarbonates such as diisopropyl peroxydicarbonate; acyl cycloalkyl sulfonyl peroxides such as acetyl cyclohexyl sulfonyl peroxide; and azo compounds such as $\alpha,\alpha'$-azodiisobutyronitrile. The amount of catalyst used will depend on, inter alia, the reaction temperatures utilized and on the nature of the catalyst but amounts within the range 0.005 to 2 percent by weight of the vinyl chloride initially charged are generally suitable. Mixtures of catalysts may be used if desired.

Dispersing agents may be added to the reaction mixture if desired and are generally water-soluble protective colloids such as gelatin, partially or completely hydrolyzed polyvinyl acetate, polyalkylene oxides such as polyethylene oxide, methyl cellulose or hydroxyethyl cellulose.

The amount of dispersing agent used is generally from 0.01 to 5 percent, preferably 0.04 to 1 percent by weight of the vinyl chloride originally charged to the autoclave.

The chlorination may be conducted by any of the well-known techniques such as chlorination in suspension or in solution, or in powder form, for example using a fluidized bed.

We prefer, however, to use a suspension chlorination process wherein the copolymer is suspended in an inert medium such as carbon tetrachloride or water, optionally containing a swelling agent such as carbon tetrachloride, while chlorine gas is passed through the suspension. The chlorination is generally conducted with the assistance of illumination, for example, UV light and/or a chemical catalyst for example, oxygen, hydrogen peroxide, or a free radical initiator such as a dialkyl peroxide or an alkyl hydroperoxide or an azo compound such as azodiisobutyronitrile.

Examples of suitable chlorination processes are described in United Kingdom Pat. Specifications 893,288, 948,372, 976,001, 1,081,057, 1,093,374, and 1,101,540.

A typical chlorination process that may be used is to suspend the copolymer in carbon tetrachloride and, while vigorously stirring, heat the slurry to 70° to 80° C., purge the chlorination vessel with nitrogen to remove residual oxygen, and add chlorine at a rate consistent with good chlorine uptake. After about 15 minutes, during which the reaction medium becomes saturated with chlorine, a chemical catalyst, for example 0.1 percent by weight, based on the weight of the polymer, of azodiisobutyronitrile is added, and chlorine is continuously passed into the vessel until the desired chlorine content is reached (this may be assessed by measuring the amount of hydrogen chloride evolved). The chlorination vessel is then purged with nitrogen to remove excess chlorine and hydrogen chlorine. The chlorinated polymer may be isolated by azeotropic distillation with methanol to remove the carbon tetrachloride and then filtering and drying the polymer in an oven. Instead of using an azeotropic distillation process, the polymer can be isolated by continuously precipitating the polymer in methonal at room temperature.

The latter method is preferred as it gives a final product having a particle type that renders the polymer more readily processed.

Where an aqueous suspension chlorination process is used the catalyst may be UV light, oxygen, hydrogen peroxide, a dialkyl peroxide, or an alkyl hydroperoxide. Diacyl peroxides are not very effective unless sufficient organic solvent, for example carbon tetrachloride, is also added to dissolve the peroxide and carry it into the polymer particles.

The chlorination should be conducted to give a final chlorine content of in the range 60 to 69 percent by weight, depending on the desired softening point of the afterchlorinated polymer, and is preferably within the range 63 to 67 percent by weight.

The chlorinated copolymers prepared by the process of the present invention may be compounded with the usual vinyl chloride polymer additives such as stabilizers, lubricants, processing aids, plasticizers, impact modifiers, fillers, pigments, and dyes depending on the application envisaged for the composition.

The chlorinated heterogeneous copolymers may also be blended, if desired, with unchlorinated vinyl chloride homo or copolymers in order to provide a cheaper and more easily processed material than a chlorinated vinyl chloride homopolymer of equivalent softening point to the blend.

Compositions formed from the chlorinated copolymers may be used for many purposes including both rigid and flexible applications such as sheet, film, rod, pipe, and other shaped articles made by techniques such as extrusion, calendering, injection molding, blow molding, or the powder fabrication processes such as fluidized bed coating or rotational casting.

The invention is illustrated by the following examples in which all parts and percentages are expressed by weight.

EXAMPLES

Preparation of heterogeneous copolymers

A. vinyl chloride/vinyl acetate copolymer

A stainless steel autoclave or capacity 260 liters fitted with a stirrer was charged with 130 liters of distilled water; 130 g. of a partially hydrolyzed polyvinyl acetate and 35 g. of diisopropyl peroxydicarbonate (catalyst), and then 77 kg. of vinyl chloride were added, the vessel being continuously stirred. The vessel and contents were heated to 50° C. and maintained at that temperature while polymerization of the vinyl chloride took place. After 5½ hours, when the conversion was 66 percent, 2.0 kg. of vinyl acetate (2.6 percent by weight) were added and the temperature increased to 72° C. Polymerization was continued for a further 80 minutes and then the excess of monomer was vented off from the reaction vessel and the contents were centrifuged. The resulting copolymer was washed and dried at 50° C. for 24 hours.

B. vinyl chloride/propylene copolymer

The procedure and quantities used were the same as those used to make the vinyl chloride/vinyl acetate copolymer above, replacing the vinyl acetate by propylene. However, the temperature was increased to 77° C. instead of to 72° C., and the polymerization was continued after increasing the temperature for 9 hours.

The properties of the two copolymers, and also of a comparable vinyl chloride homopolymer were as follows:

| Polymer | K-value (Fikentscher) | 1/10 Vicat softening point (°C.) | % comonomer found by analysis |
|---|---|---|---|
| vinyl chloride/vinyl acetate | 57.0 | 72.9 | 1.9 |
| vinyl chloride/propylene chloride/propylene | 57.6 | 74.7 | 1.0 |
| vinyl chloride homopolymer | 60 | 76.6 | |

Chlorination of the copolymers 1,500 g. of the copolymer was slurried in a chlorination vessel in 9 liters of carbon tetrachloride with vigorous stirring and the mixture was heated to 73° C. The vessel was then purged with nitrogen to remove residual air and chlorine was then introduced into the slurry at a rate consistent with good chlorine uptake. After 15 minutes, during which time the reaction medium had become saturated with chlorine 1.5 g. of azodiisobutyronitrile was added and the chlorine was continuously passed into the vessel. The hydrogen chloride evolved was measured in order to check on the progress of the chlorination and after about 3 hours the vessel was purged with nitrogen to remove the excess of chlorine and hydrogen chloride. The resultant mixture was azeotropically distilled with methanol to remove the carbon tetrachloride and the resultant chlorinated copolymer was filtered and dried in an oven at 60° C.

One hundred parts of the chlorinated polymer were mixed with 1.75 parts of tribasic lead sulfate, 1.5 parts of calcium stearate and 3 parts of glyceryl monostearate. The composition was then milled into a crepe on a two roll mill in which the rolls were maintained at 170° and 180° C. respectively.

The softening point was measured by the cantilever softening point test (British Standard 2782 Method 102c) using samples of size 1.25×0.25×0.06 inches formed from the milled crepe. These samples are clamped horizontally at one end and immersed in a bath of glycerine. A 20 g. weight is suspended at the unclamped end of the sample by means of a 1/16-inch diameter hole 0.062 inches from the end of the sample. The temperature of the glycerine bath is raised at 1° C. per minute from room temperature and the softening point is quoted as the temperature at which the sample has sagged through 30°.

The processing characteristics of the chlorinated polymers were measured using a mixture of 100 parts of the chlorinated polymer powder, 4 parts of tribasic lead sulfate, 2 parts of glyceryl monostearate and 1 part of calcium stearate. Various amounts (charge weights) of the mixture was charged to a Brabender Plastograph fitted with a cam mixing head having a chamber capacity of 30 ml. and maintained at a temperature of 180° C. The material in the chamber is mixed by a stirrer fitted with blades and rotating at 30 r.p.m. The torque required to rotate the stirrer is measured and plotted against the time from introducing the charge. Fusion is considered to have occurred when the torque passes through a maximum as the polymer particles cohere together to form a continuous melt. The time at which this maximum occurs is termed the gelation time. The equilibrium value of the torque, i.e., the value to which it levels out after passing through the maximum is also measured. The shorter the gelation time and the lower the equilibrium torque, therefore, the better is the processability of the composition.

The gelation time and equilibrium torque were also measured at a chamber temperature of 200° C.

The various results are quoted in table 1 below together with data on chlorinated vinyl chloride homopolymers of similar molecular weight and chlorine content.

Also present in table 1 are the softening points of chlorinated vinyl chloride homopolymers of equal chlorine content to the chlorinated copolymers obtained from a graph of softening point v. chlorine content of a series of chlorinated vinyl chloride homopolymers. From this table it is readily seen that although the basic heterogeneous copolymers have lower or similar softening points to the homopolymers upon chlorination the softening point is markedly increased compared with homopolymers chlorinated to a similar final chlorine content but have similar processabilities.

Alternatively, by comparing sample 5 with the control samples 1 and 2 it is seen that a similar softening point as the chlorinated homopolymer can be achieved by chlorinating a heterogeneous copolymer to a lesser degree and such a chlorinated heterogeneous copolymer has improved processability compared with a chlorinated homopolymer of similar softening point.

We claim:

1. A process for the manufacture of afterchlorinated vinyl chloride polymers consisting of afterchlorinating a vinyl chloride copolymer made by (i) polymerizing vinyl chloride at

TABLE 1

| Sample | Basic polymer | | | | Chlorinated polymer | | | Gelation properties | | | | | | | | | |
|---|---|---|---|---|---|---|---|---|---|---|---|---|---|---|---|---|---|
| | Nature of polymer | Percent comonomer | K value | 1/10 Vicat softening point, °C. | Isolation method | Chlorine content, percent | Cantilever softening point (°C.) | | | Chamber temperature 180° C. | | | | Chamber temperature 200° C. | | | |
| | | | | | | | Chlorinated polymer | Chlorinated homopolymer of same chlorine content | | Gelation time in seconds at charge weights (gms.) | | | Torque (M Kg.) at charge weights (gms.) | | Gelation time in seconds at charge weights (gms.) | | Torque (M Kg.) at charge weights (gms.) | |
| | | | | | | | | | | 27 | 30 | 33 | 36 | 27 | 30 | 33 | 36 | 30 | 33 | 36 | 30 | 33 | 36 |
| 1 | Homopolymer | | 60 | 76.6 | | 66 | 118 | 118 | | | 260 | 220 | 140 | | 1.9 | 2.1 | 2.4 | | | | | |
| 2 | do | | 50 | ~74 | | 65 | 115 | 115 | | | 250 | 180 | 120 | | 1.9 | 2.1 | 2.3 | | | | | |
| 3 | Vinyl chloride/vinyl acetate copolymer | 1.9 | 57 | 72.9 | (1) | 66.3 | 121 | 126 | | | | | | | | | | | | | | |
| 4 | Vinyl chloride/propylene copolymer | 1.0 | 57.6 | 74.7 | (2) | 66.5 | 121 | 125 | | | 170 | 130 | 60 | | 1.8 | 2.0 | 2.0 | 150 | 180 | 1.7 | 1.9 | 2.1 |
| 5 | do | 1.0 | 57.6 | 74.7 | (2) | 64.0 | 107 | 115 | | 240 | 300 | 280 | 120 | | 1.4 | 2.1 | 2.1 | 2.4 | 180 | 210 | 1.7 | 1.9 | 2.2 |
| 6 | do | 1.0 | 57.6 | 74.7 | (2) | 65.7 | 116 | 128 | | | | | | | | | | | 165 | | 1.6 | 1.8 | 2.0 |
| 7 | do | 1.0 | 57.6 | 74.7 | (2) | 68.3 | 133 | 143 | | | 270 | | | | | | | | 195 | 270 | 2.0 | | 2.2 |

[1] Separate by azeotropic distillation.
[2] Separate by precipitation.

a first polymerization temperature within the range 30°–80° C., (ii) adding a copolymerizable monomer selected from the group consisting of vinyl esters, vinylidene chloride, alkyl acrylates and olefins in an amount of from 0.2 to 10 percent by weight of the original vinyl chloride charge, when at least 40 percent by weight of the vinyl chloride has been converted to polymer, the amount of added comonomer being, by weight, less than the amount of the remaining unreacted vinyl chloride and (iii) polymerizing the mixture of the remaining vinyl chloride and the comonomer at a temperature within the range 35° to 85° C. which temperature is at least 5° C. higher than said first polymerization temperature.

2. A process as claimed in claim 1 wherein the amount of comonomer added is from 0.5 to 5 percent by weight of the original vinyl chloride charge.

3. A process as claimed in claim 1 in which the comonomer is added before 95 percent by weight of the vinyl chloride has been converted to polymer.

4. A process as claimed in claim 3 in which the comonomer is added when from 42 to 70 percent by weight of the vinyl chloride has been converted to polymer.

5. A process as claimed in claim 1 wherein the mixture of vinyl chloride and comonomer is polymerized at a temperature from 10° to 35° C. greater than the first polymerization temperature.

6. A process as claimed in claim 5 in which the mixture of vinyl chloride and comonomer is polymerized at a temperature from 15° to 30° C. greater than the first polymerization temperature.

7. A process as claimed in claim 1 wherein the first polymerization temperature is in the range 35° to 60° C.

8. A process as claimed in claim 1 wherein the second polymerization temperature is in the range 65° to 80° C.

9. A process as claimed in claim 1 wherein the comonomer is selected from vinyl acetate, vinylidene chloride, ethyl acrylate, methyl methacrylate, ethylene and propylene.

10. A process as claimed in claim 1 in which the polymerization is conducted in aqueous suspension.

11. A process as claimed in claim 1 wherein the chlorination of the copolymer is conducted by a suspension chlorination process.

12. A process as claimed in claim 11 wherein the copolymer is chlorinated while suspended in carbon tetrachloride.

13. A process as claimed in claim 12 wherein the chlorinated copolymer is isolated by precipitation in methanol.

14. A process as claimed in claim 1 wherein the copolymer is chlorinated to a final chlorine content of from 60 to 69 percent by weight.

15. A process as claimed in claim 14 wherein the copolymer is chlorinated to a final chlorine content of from 63 to 67 percent by weight.

* * * * *